July 21, 1936.  F. W. BENNINGTON  2,048,053
VEHICLE BRAKE
Filed Aug. 16, 1934
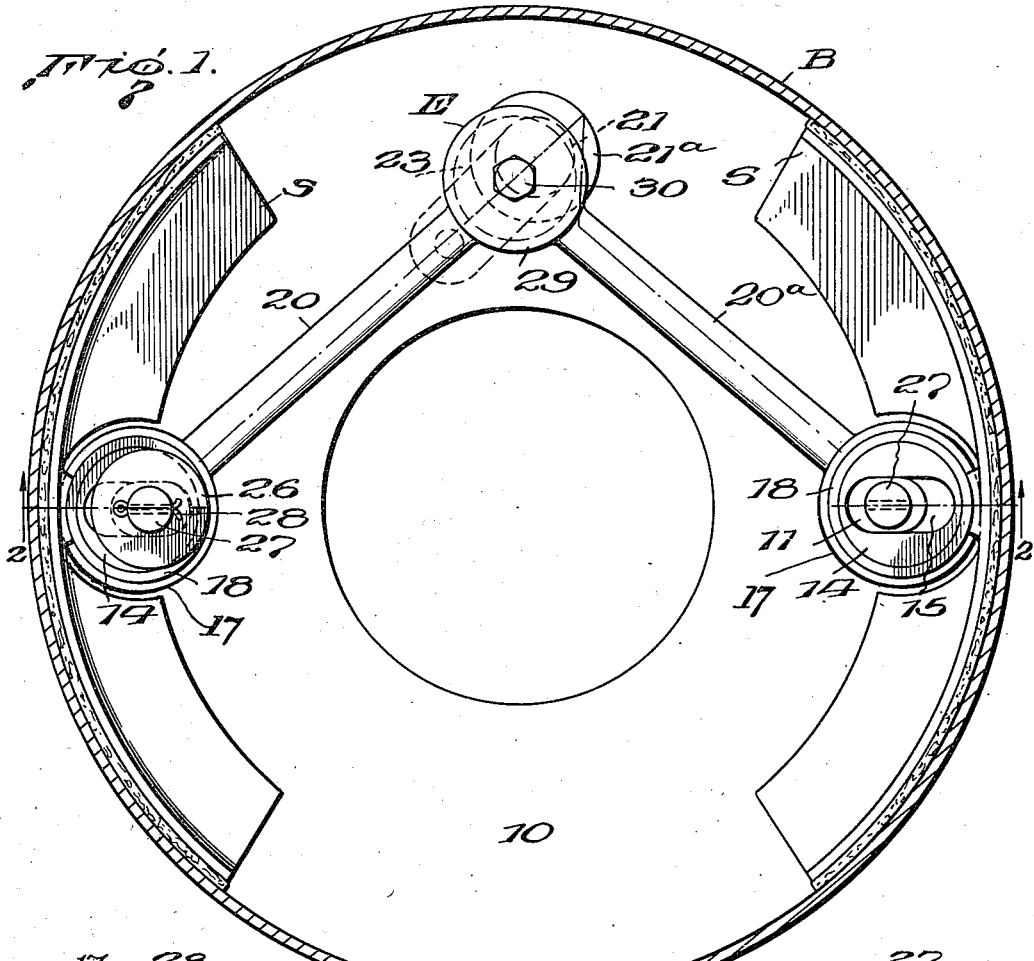
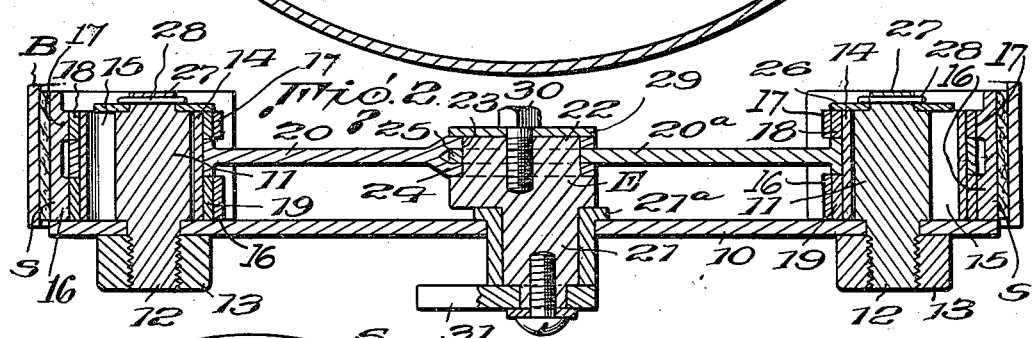
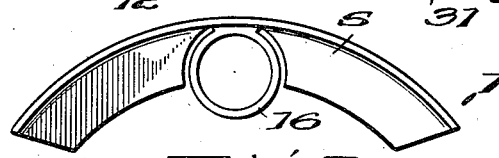
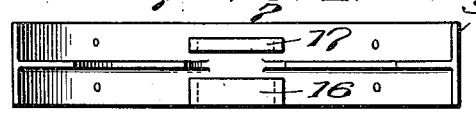
Inventor
Frank W. Bennington,
By
Attorney Patented July 21, 1936

2,048,053

UNITED STATES PATENT OFFICE 2,048,053

VEHICLE BRAKE

Frank W. Bennington, Portis, Kans., assignor of one-half to Roy L. Hamilton, Beloit, Kans.

Application August 16, 1934, Serial No. 740,158

8 Claims. (Cl. 188—78)

This invention is a vehicle brake primarily intended for motor vehicle use, but not limited to such use.

One of the objects of the invention is to provide a simple brake of the character mentioned, in which the parts are so constructed and arranged as to apply equalized pressure simultaneously to all of the brake shoes during the braking operation. A further object is to provide means for so supporting the brake shoes that they are constrained to travel in rectilinear paths which are disposed radially with respect to the brake drum. A further object is to provide an inexpensive form of braking mechanism constructed of few parts in such manner that a maximum of braking power is obtainable with a minimum number of parts, and so constructed and arranged that it will not readily get out of order, and with the parts readily accessible, so that repairs and replacements may be quickly and easily effected.

The invention will be hereinafter fully set forth and particularly pointed out in the claims.

In the accompanying drawing:—

Figure 1 is a side elevation illustrating a braking mechanism constructed in accordance with the invention. Figure 2 is a horizontal sectional view on the line 2—2, Figure 1. Figures 3 and 4 are detail side and rear views, respectively, illustrating one of the brake shoes.

Referring to the drawing, 10 designates a supporting plate which is adapted to be supported in suitable manner by the vehicle, and provided with a central opening for the passage of the wheel hub (not shown). One or more brake shoe anchor-studs 11 are secured to plate 10 in such manner as to project inwardly. Each stud is of elliptical cross section, as shown, and provided at one end with a threaded shank 12, projected through an opening in the plate 10, and retained in position by a nut 13. It will be observed that the studs 11 are disposed diametrically opposite to each other so that an imaginary line connecting them would pass through the center of the opening in the plate 10.

Slidably mounted on each anchor stud 11, is a sleeve 14, having an elliptical bore 15, complemental to the stud, the longer diameter of the bore, however, being greater than the corresponding diameter of the stud, so that the sleeve may slide upon the stud without rotating. It will be noted that the longer diameter of the stud is arranged radially with respect to the brake drum B, so that all sliding movements of the sleeve 14 are in radial directions.

Each brake shoe S is of arcuate form and complemental to the flange of the brake drum, and is provided with relatively spaced hub portions 16 and 17, to receive a sleeve 14. Bushings 18 and 19 are interposed between the periphery of each sleeve 14 and the inner surfaces of the hub portions 16 and 17, said bushings being relatively spaced with respect to each other. The arrangement is such that the brake shoe is mounted upon and slidable with the sleeve 14, so that the arcuate portion thereof is moved in radial paths toward and away from the flange of the brake drum. It will be noted that the hub portions 16 and 17 are located intermediate between the ends of the respective shoes.

Movement of the brake shoes is effected by means of an eccentric E, connected to the sleeves 14 by brake arms 20 and 20a respectively. The eccentric E may be of any desired construction, but as shown consists of a shaft 21, rotatively mounted in a suitable bearing member 21a, carried by the plate 10. Integrally formed with said shaft is a cam 22, having a reduced portion 23. The arm 20 is provided with a collar portion which encircles a sleeve 14 and is interposed between the bushings 18 and 19, thereof. The other end of said arm 20 is provided with a double ring or fork portion 24 which encircles the reduced portion 23 of the cam 22. One end of the arm 20a is provided with a collar portion to encircle a sleeve 14 in the same manner as the arm 20, the other end of said arm 20a having a thin collar portion 25, adapted to encircle the reduced portion 23 of the cam 22, between the separated collar portions 24 of the arm 20. The collar portions of the arms 20 and 20a which encircle the sleeves 14, together with the bushings 18 and 19, are retained in place by means of cover plates 26, through which extend projections 27 of the stud 11, said plates being held in position by suitable means, such as cotter pins 28. The ends 24 and 25 of the brake arms are retained in position in engagement with the cam portion 23, by means of a cover plate 29, which is removably maintained in place by a screw 30. The shaft 21 is rotated by any suitable means, such as a radial arm 31, connected to a brake pedal or other operating means (not shown).

In operation, when the brake pedal is moved to braking position, the shaft 21 is rotated, thereby imparting corresponding rotation to the cam 22. The effect of this is to push the brake rods 20 and 20a in such manner as to slide the sleeves transversely of the studs 11, thereby moving the brake shoes in opposite radial directions toward the rim of the brake drum, and applying direct braking pressure by contacting the full areas of the brake shoes with the brake drum. Obviously, reverse rotation of the shaft 21 will move the brake shoes away from the flange of the brake drum.

The advantages of the invention will be readily understood by those skilled in the art to which it belongs. For instance, it will be observed that by moving the brake shoes in radial paths the braking power is uniformly applied by all of them, and a maximum of braking efficiency is obtained because the full braking surfaces of all of the shoes is simultaneously applied. It will also be observed that a very simple form of braking mechanism is provided, the same being made up of few parts so arranged that they are readily accessible, whereby repairs and replacements, when required, may be made quickly and without difficulty. A very important advantage is the great power and braking efficiency that may be applied to the brake drum by the use of the eccentric and the described intermediate connections between said eccentric and the brake shoes.

Having thus explained the nature of the invention and described an operative manner of constructing and using the same, although without attempting to set forth all of the forms in which it may be made, or all of the forms of its use, what is claimed is:—

1. A brake of the character described comprising a supporting plate, a brake drum operable adjacent thereto, anchor studs secured to said plate at diametrically opposite positions, sleeves mounted on said studs, said sleeves and said studs being so relatively constructed and arranged that the sleeves are free to slide transversely of the studs and radially with respect to said drum, but are held against relative rotation, brake shoes mounted on said sleeves and having braking surfaces so positioned as to be engageable with the brake drum, and means for effecting sliding movement of said sleeves and the brake shoes carried thereby.

2. A brake of the character described comprising a supporting plate, a brake drum operable adjacent thereto, anchor studs of elliptical cross section secured to said plate at diametrically opposite positions, sleeves having elliptical bores movably engaging said studs, the larger diameters of said bores being greater than the corresponding diameters of said studs, so that the sleeves are movable transversely of the studs and radially with respect to said drum, but are prevented from rotating thereon, brake shoes having portions between their ends mounted on said sleeves, and means for moving the sleeves transversely of the studs.

3. A brake of the character described comprising a supporting plate, a brake drum operable adjacent thereto, anchor studs secured to said plate at diametrically opposite positions, sleeves mounted on said studs, said sleeves and studs being provided with means so constructed and arranged that the sleeves are free to move transversely of the studs and radially with respect to said drum, but are held against rotation with respect thereto, brake shoes mounted on said sleeves, an eccentric rotatively mounted on said plate, and means connecting said eccentric and said sleeves in such manner that rotation of the eccentric imparts movement to the sleeves transversely of the studs.

4. A brake of the character described comprising a supporting plate, a brake drum operable adjacent thereto, anchor studs each having threaded portions at one end extended through said plate at diametrically opposite positions, nuts engaging said threaded portions in such manner as to anchor the studs to the plate, sleeves mounted on said studs, each sleeve and stud being provided with means so constructed and arranged that the sleeve is free to move transversely of the stud in a radial direction with respect to the brake drum but is held against rotation during such movement, brake shoes having portions between their ends mounted on said sleeves, and means for moving the sleeves transversely of said studs.

5. A brake of the character described, comprising a supporting plate, a brake drum operable adjacent thereto, elliptical anchor studs secured to said plate, sleeves mounted on said studs, each sleeve having an elliptical bore complemental to its stud but with its larger diameter greater than the corresponding diameter of the stud, brake shoes each having separated hub portions encircling a sleeve, operating arms each having a ring-like portion encircling a sleeve, and means for reciprocating said arms in such manner as to impart movement to the sleeves transversely of the studs.

6. A brake of the character described comprising a supporting plate, a brake drum operable adjacent thereto, studs of elliptical cross section secured to said plate, sleeves of cylindrical form provided with elliptical bores complemental to said studs, the larger diameters of said bores being larger than the corresponding diameters of the studs, so that the sleeves will move transversely of the studs without rotating, brake shoes carried by said sleeves, an operating member provided with a shaft portion rotatively mounted in said plate and also provided with a cam portion, and brake arms having ring-like end portions encircling the cam portion and each having another ring-like portion encircling a sleeve.

7. A brake of the character described comprising a supporting plate, a brake drum operable adjacent thereto, elliptical anchor studs projecting from the inner face of said plate, cylindrical sleeves mounted on the respective studs, each sleeve having an elliptical bore complemental to the stud but with its greater diameter larger than the corresponding diameter of the stud, brake shoes mounted on the respective sleeves, operating arms for the respective sleeves, each arm having a ring-like end encircling a sleeve, and actuating means engaging the other ends of said arms in such manner as to impart movement to the sleeves transversely of the studs.

8. A brake of the character described comprising a supporting plate, a brake drum operable adjacent thereto, studs of elliptical cross section each having one end secured to said plate in such manner as to project from a face thereof, cylindrical sleeves engaging said studs, each sleeve having an elliptical bore complement to its stud but with its greater diameter longer than the corresponding diameter of the stud, so that the sleeve is free to move transversely of the stud but is held from rotation thereon, operating arms, each arm having a ring-like portion at one end encircling a sleeve, and a ring-like portion at the other end, an eccentric rotatively supported by said plate and having a cam portion engaged by the last mentioned ends of said arms, means for preventing movement of said arms longitudinally with respect to said studs, and means for preventing movement of said arms longitudinally with respect to said cam portion.

FRANK W. BENNINGTON.